Inventor
R. L. Levy also known
as René Lucien

Patented Oct. 10, 1950

2,525,362

UNITED STATES PATENT OFFICE 2,525,362

DEVICE FOR AUTOMATICALLY RETURNING AND LOCKING MOVABLE MEMBERS, IN PARTICULAR AIRCRAFT WHEELS

René Lucien Levy, also known as René Lucien, Paris, France, assignor to Societe d'Inventions Aeronautiques et Mecaniques S. I. A. M., Geneva, Switzerland, a corporation of Switzerland Application November 26, 1946, Serial No. 712,396
In France December 6, 1945

6 Claims. (Cl. 267—1)

The invention consists in a device which alternatively makes it possible:

1. Either to return, with an adjustable force, to a normal position called medial position, a member adapted to effect angular displacements of variable amplitude on either side of said medial position, so long as such amplitude does not exceed a predetermined limiting value;

2. Or to lock the said member in said medial position;

3. Or to release said member completely from this return action.

The invention applies in particular to the orientatable wheels of aircraft, especially to the front wheel, and thus enables at will this wheel either to swing loosely, or to be practically locked, or to be returned automatically to the medial position so long as it does not move beyond a predetermined angular field.

In its principle, the invention is characterised by the fact that plates or equivalent members, which are respectively urged by the pistons of hydraulic cylinders supplied, through a hydropneumatic accumulator, by a source of fluid at adjustable pressure, are made to act on a flat-sided cam adapted to rotate in unison with the wheel or other member to be controlled.

The pressure is adjusted at will by the action of a hand pressure regulator mounted on the pipe connecting the cylinders to the source of pressure fluid.

The number of flat portions, and consequently the number of pistons and cylinders corresponding thereto, is generally equal to two, in which case the flat portions are located in diametrically opposite positions on said cam, but it could also differ from two without exceeding the scope of the invention.

Figure 1:
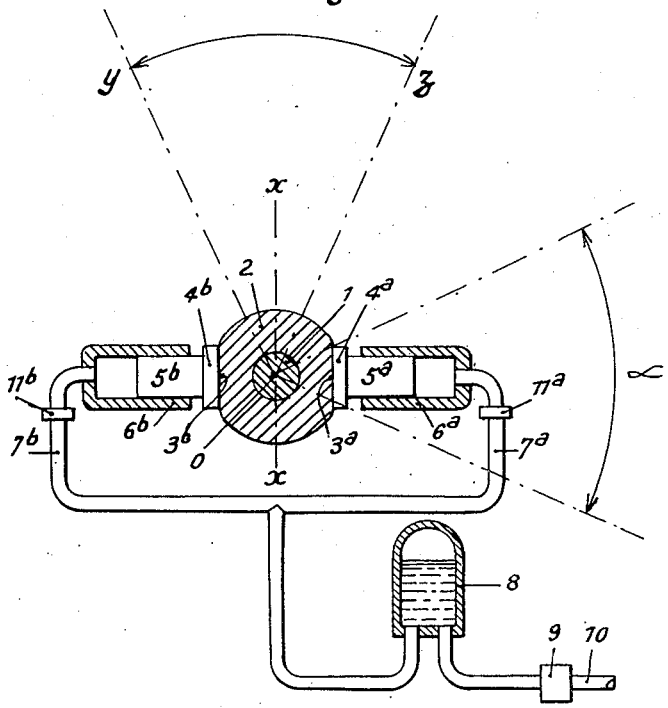
Figure 2:
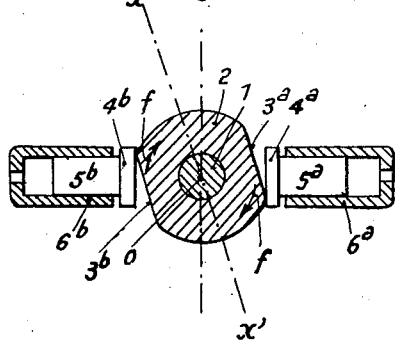

In the accompanying diagrammatic drawing:

Fig. 1 shows in the medial position, Fig. 2 in a different position, a device according to the invention in the application thereof to an aircraft wheel.

The pivot 1 of the wheel (not shown) is rotatably secured to a cam comprising a cylindrical member 2 provided with two diametrically opposite flat portions $3a$—$3b$.

On said flat portions bear plates, respectively $4a$—$4b$ urged by pistons $5a$—$5b$ respectively which are movable in hydraulic cylinders $6a$—$6b$. The plates may be formed in practice by the widened heads of the pistons.

The cylinders $6a$—$6b$ communicate through pipes $7a$—$7b$ with a hydro-pneumatic accumulator 8 which is connected, through a hydraulic hand pressure regulator 9, to the general hydraulic supply pipe 10 which supplies pressure fluid to the various servo-controls of the aircraft.

The function of the hydraulic hand pressure regulator, as known, consists in enabling the pressure of the fluid in the pipe below it to be reduced at will and in an adjustable manner.

When the hydraulic hand pressure regulator is set to zero value, the plates $4a$—$4b$ exert practically no action on the cam 2 if friction is considered to be negligible, so that the wheel carried by the pivot 1 is loose as regards direction.

When said hand pressure regulator is set for maximum pressure, which should be calculated at the suitable value in each case of utilisation, the plates $4a$—$4b$ are firmly pressed against the flat portions and prevent any angular displacement of the cam, so that the wheel is locked in its medial direction corresponding, for example, to the axis $x$—$x$.

On the other hand, for all the intermediate values of the pressure admitted to the pipes $7a$—$7b$ by the hand pressure regulator, if said medial direction is altered for any reason whatsoever (Fig. 2), the plates $4a$—$4b$ acting on the flats, continually and automatically return the cam (arrows $f$) to the medial position which it occupies in Fig. 1. It will be seen that this automatic return action is exerted so long as the plates remain in contact with two of the diametrically opposite edges of each of the flats, that is to say that said return action is exerted in the angular field $y$—$o$—$z$, which is practically equal to the angle $a$, for the corresponding positions which the wheel can assume on either side of its medial position.

It should be observed:

1. That the intensity of the couple which produces this return action depends on the pressure in the hydraulic cylinders and that, consequently, it is adjustable by means of the hand pressure regulator 9;

2. That said return action is exerted in a resilient manner owing to the presence of the accumulator 8;

3. That the pivot of the wheel is not subjected to any transverse reaction due to said return action.

According to a complementary characteristic of the invention, the inlet of the pressure fluid to the hydraulic cylinders may advantageously be effected through valves $11a$—$11b$ of a type known per se, which allow the liquid to penetrate freely into said cylinders but which brake the outlet thereof. In this construction, the device, in addition to its main function, acts as a hydraulic damper for the shimmy movements of the wheel which is controlled by it.

The invention can also be applied if the hydraulic cylinders are replaced by a similar pneumatic system.

I claim:

1. A device for obtaining at will the return in a median position, the locking and the release of an orientable aircraft wheel, comprising in combination with the wheel a cam adapted to rotate in unison with said wheel, two flat portions on said cam, two plates respectively normally engaging said flat portions, a source of pressure fluid, means for regulating the pressure of said fluid between a practically zero value and a maximum value, means for subjecting said plates to the action of said fluid under pressure.

2. A device for obtaining at will the return in a median position, the locking and the release of an orientable aircraft wheel, comprising a cam adapted to rotate in unison with said wheel, two flat portions on said cam, two plates respectively normally engaging said flat portions, a hydropneumatic accumulator, two hydraulic cylinders connected with said accumulator, two pistons respectively movable in said cylinders, and respectively connected with said plates.

3. A device for obtaining at will the return in a median position, the locking and the release of an orientable aircraft wheel, comprising a cam adapted to rotate in unison with said wheel, two flat portions on said cam, two plates respectively normally engaging said flat portions, a hydropneumatic accumulator, means for regulating the pressure of said accumulator, two hydraulic cylinders connected with said accumulator, two pistons respectively movable in said cylinders and respectively rigid with said plates.

4. A device for obtaining at will the return in a median position, the locking and the release of an orientable aircraft wheel, comprising a cam adapted to rotate in unison with said wheel, two flat portions on said cam, two plates respectively normally engaging said flat portions, a hydropneumatic accumulator, a pipe feeding said accumulator with a fluid under pressure, a hydraulic hand pressure regulator interposed on said pipe, two hydraulic cylinders connected with said accumulator, two pistons respectively movable in said cylinders, and respectively connected with said plates.

5. A device for obtaining at will the return in a median position, the locking and the release of an orientable aircraft wheel, comprising a cam adapted to rotate in unison with said wheel, two flat portions on said cam, two plates respectively normally engaging said flat portions, a hydropneumatic accumulator, a pipe feeding said accumulator with a fluid under pressure, a hydraulic hand pressure regulator interposed on said pipe, two hydraulic cylinders connected with said accumulator, two pistons respectively movable in these cylinders and respectively rigid with said plates.

6. A device for obtaining at will the return in a median position, the locking and the release of an orientable aircraft wheel, comprising a cam adapted to rotate in unison with said wheel, two flat portions on said cam, two plates respectively normally engaging said flat portions, a hydropneumatic accumulator, means for regulating the pressure of said accumulator, two hydraulic cylinders connected with said accumulator, two pistons respectively movable in these cylinders and respectively connected with said plates, valves for braking the fluid circulation from the cylinders to the accumulator.

RENÉ LUCIEN LEVY,
*Also known as René Lucien.*

REFERENCES CITED

The following references are of record in the file of this patent:

UNITED STATES PATENTS

| Number | Name | Date |
|---|---|---|
| 1,262,995 | Strandlund | Apr. 16, 1918 |
| 1,611,940 | Ohmer | Dec. 28, 1926 |
| 1,700,044 | Hales | Jan. 22, 1929 |

FOREIGN PATENTS

| Number | Country | Date |
|---|---|---|
| 396,343 | Great Britain | Aug. 3, 1933 |
| 480,296 | Great Britain | Feb. 21, 1938 |
| 549,773 | Great Britain | Dec. 7, 1942 |